United States Patent
Lee

(10) Patent No.: US 11,201,320 B2
(45) Date of Patent: Dec. 14, 2021

(54) ANODE ACTIVE MATERIAL FOR LITHIUM SECONDARY BATTERY, AND LITHIUM SECONDARY BATTERY COMPRISING SAME

(71) Applicant: SAMSUNG SDI CO., LTD., Yongin-si (KR)

(72) Inventor: Soojeong Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 16/327,403

(22) PCT Filed: Aug. 17, 2017

(86) PCT No.: PCT/KR2017/008925
§ 371 (c)(1),
(2) Date: Feb. 22, 2019

(87) PCT Pub. No.: WO2018/038453
PCT Pub. Date: Mar. 1, 2018

(65) Prior Publication Data
US 2019/0198863 A1  Jun. 27, 2019

(30) Foreign Application Priority Data

Aug. 24, 2016  (KR) .................. 10-2016-0107978

(51) Int. Cl.
*H01M 4/133* (2010.01)
*H01M 10/0525* (2010.01)
(Continued)

(52) U.S. Cl.
CPC ............ *H01M 4/133* (2013.01); *H01M 4/13* (2013.01); *H01M 4/134* (2013.01); *H01M 4/364* (2013.01);
(Continued)

(58) Field of Classification Search
None
See application file for complete search history.

(56) References Cited

U.S. PATENT DOCUMENTS

| | | | | |
|---|---|---|---|---|
| 5,888,430 A | * | 3/1999 | Wakayama | ........... H01M 4/364 |
| | | | | 252/503 |
| 6,254,729 B1 | * | 7/2001 | Doelle | ................. B01D 29/012 |
| | | | | 162/251 |

(Continued)

FOREIGN PATENT DOCUMENTS

| | | |
|---|---|---|
| CN | 105280891 A | 1/2016 |
| JP | 2013-131325 A | 7/2013 |

(Continued)

OTHER PUBLICATIONS

Eckmann et al. "Probing the Nature of Defects in Graphene by Raman Spectroscopy" Nano Letters, 2012, 12, pp. 3925-3930; available online from pubs.acs.org/NanoLett and a PDF copy is attached (Year: 2012).*

(Continued)

*Primary Examiner* — Katie L. Hammer
(74) *Attorney, Agent, or Firm* — Lee IP Law, P.C.

(57) ABSTRACT

Disclosed is that an anode active material for a lithium secondary battery, and a lithium secondary battery comprising the same. The anode active material for a lithium secondary battery comprises a composite of a Si-based or Sn-based material and a carbon-based material, a Raman spectrum peak intensity ratio ($I_D/I_{D'}$) of a peak intensity ($I_D$) of a D peak (1360 cm$^{-1}$ to 1370 cm$^{-1}$) relative to a peak intensity ($I_{D'}$) of a D' peak (1620 cm$^{-1}$ to 1625 cm$^{-1}$) of the carbon-based material is 4.5 to 10, a peak intensity ratio ($I_G/I_D$) of a peak intensity ($I_G$) of a G peak (1580 cm$^{-1}$ to 1590 cm$^{-1}$) relative to a peak intensity ($I_D$) of a D peak (1360 cm$^{-1}$ to 1370 cm$^{-1}$) of the carbon-based material is (Continued)

(a)

(b)

0.6 to 1.5, and an average diameter (D50) of the Si-based or Sn-based metallic material is 30 nm to 80 nm.

8 Claims, 2 Drawing Sheets

(51) Int. Cl.
    *H01M 4/587*     (2010.01)
    *H01M 4/13*     (2010.01)
    *H01M 4/134*     (2010.01)
    *H01M 4/36*     (2006.01)
    *H01M 4/38*     (2006.01)
    *H01M 4/583*     (2010.01)
    *H01M 4/02*     (2006.01)

(52) U.S. Cl.
    CPC ........... *H01M 4/386* (2013.01); *H01M 4/387* (2013.01); *H01M 4/583* (2013.01); *H01M 4/587* (2013.01); *H01M 10/0525* (2013.01); *H01M 2004/021* (2013.01); *H01M 2004/027* (2013.01); *Y02E 60/10* (2013.01)

(56) References Cited

U.S. PATENT DOCUMENTS

| | | | |
|---|---|---|---|
| 6,482,547 B1 | 11/2002 | Yoon et al. | |
| 2007/0281216 A1* | 12/2007 | Petrat | H01M 4/386 |
| | | | 429/324 |
| 2010/0193731 A1* | 8/2010 | Lee | H01M 4/366 |
| | | | 252/182.1 |
| 2012/0077087 A1 | 3/2012 | Cho et al. | |
| 2014/0170490 A1 | 6/2014 | Izuhara et al. | |
| 2014/0234722 A1 | 8/2014 | Kyotani et al. | |
| 2014/0349187 A1 | 11/2014 | Hirose et al. | |
| 2015/0194698 A1 | 7/2015 | Youm | |
| 2015/0311526 A1 | 10/2015 | Izuhara et al. | |
| 2015/0349335 A1 | 12/2015 | Won et al. | |
| 2016/0181602 A1* | 6/2016 | Mutoh | H01M 4/386 |
| | | | 252/182.1 |
| 2016/0233520 A1 | 8/2016 | Takahashi et al. | |

FOREIGN PATENT DOCUMENTS

| | | |
|---|---|---|
| KR | 10-2010-0113433 A | 10/2010 |
| KR | 10-2014-0082965 A | 7/2014 |
| KR | 10-2015-0027022 A | 3/2015 |
| KR | 10-2015-0079888 A | 7/2015 |
| KR | 10-2015-0083381 A | 7/2015 |
| KR | 10-2015-0139154 A | 12/2015 |
| WO | WO 2004/023589 A1 | 3/2004 |
| WO | WO-2015019993 A1 * | 2/2015 ............ H01M 4/386 |

OTHER PUBLICATIONS

Korean Notice of Allowance dated Jan. 20, 2021.
Jie Jiang, et al., "A Raman spectroscopy signature for characterizing defective single-layer graphene: Defect-induced $I(D)/I(D'')$ intensity ratio by theoretical analysis", Carbon, vol. 90, Mar. 28, 2015, pp. 53-62.
Chinese Office action dated Apr. 27, 2021.

* cited by examiner (a)  (b)

ANODE ACTIVE MATERIAL FOR LITHIUM SECONDARY BATTERY, AND LITHIUM SECONDARY BATTERY COMPRISING SAME

CROSS-REFERENCE TO THE RELATED APPLICATION

This is the U.S. national phase application based on PCT Application No. PCT/KR2017/008925, filed Aug. 17, 2017, which is based on Korean Patent Application No. 10-2016-0107978, filed Aug. 24, 2016, the entire contents of all of which are hereby incorporated by reference.

TECHNICAL FIELD

An anode active material for a lithium secondary battery and a lithium secondary battery including the same are disclosed.

BACKGROUND ART

In recent years, sizes and weights of mobile information terminals such as mobile phones, notebooks, and smart phones have been rapidly increased, and capacity of batteries used as driving power sources has been demanded.

A lithium secondary battery having a high energy density and a high capacity is widely used as such a driving power source.

In addition, since mobile information terminals are required to have a function of a motion picture reproduction function, a game function, and the like, power consumption has been increased, and meanwhile terminals tends to be miniaturized, so that high capacity and high rate capability of the non-aqueous electrolyte secondary battery are more demanded.

In order to meet such demands, attempts have been made to form a composite of a carbon-based base material conventionally used as an anode and a metal oxide or a metal nanoparticle. However, when metal or metal oxide nanoparticles are used in an anode, particle deformation due to expansion/shrinkage may occur, and thus it is difficult to be commercialized at present.

DISCLOSURE

Technical Problem

An embodiment provides an anode active material for a lithium secondary battery having improved cycle-life characteristics.

Another embodiment provides a lithium secondary battery including the anode active material.

Technical Solution

An embodiment provides an anode active material for a lithium secondary battery including a composite of a Si-based or Sn-based material and a carbon-based material, wherein a Raman spectrum peak intensity ratio ($I_D/I_{D'}$) of a peak intensity ($I_D$) of a D peak (1360 cm$^{-1}$ to 1370 cm$^{-1}$) relative to a peak intensity ($I_{D'}$) of a D' peak (1620 cm$^{-1}$ to 1625 cm$^{-1}$) of the carbon-based material is 4 to 10, a peak intensity ratio ($I_G/I_D$) of a peak intensity ($I_G$) of a G peak (1580 cm$^{-1}$ to 1590 cm$^{-1}$) relative to a peak intensity ($I_D$) of a D peak (1360 cm$^{-1}$ to 1370 cm$^{-1}$) of the carbon-based material is 0.6 to 1.5, and an average diameter (D50) of the Si-based or Sn-based metallic material is 30 nm to 80 nm.

The peak intensity ratio ($I_G/I_D$) of the peak intensity ($I_{1620}$) of the G peak (1580 cm$^{-1}$ to 1590 cm$^{-1}$) relative to the peak intensity of the D peak (1360 cm$^{-1}$ to 1370 cm$^{-1}$) of the carbon-based material may be 0.65 to 1.2.

The Raman spectrum peak intensity ratio ($I_D/I_{D'}$) of the peak intensity ($I_D$) of the D peak (1360 cm$^{-1}$ to 1370 cm$^{-1}$) relative to the peak intensity of the D' peak (1620 cm$^{-1}$ to 1625 cm$^{-1}$) of the carbon-based material may be 4.5 to 9.0.

The Si-based or Sn-based material may have an average particle diameter (D50) of 40 nm to 60 nm.

The Si-based or Sn-based material may be an alloy further including Fe, Ni, Mg, Na, or a combination thereof.

The carbon-based material may be crystalline carbon.

A mixing ratio of the Si-based or Sn-based material and the carbon-based material may be a weight ratio of 50:50 to 99:1.

Another embodiment of the present invention provides a lithium secondary battery including an anode including the anode active material; a cathode comprising a cathode active material; and an electrolyte.

Other details of the embodiments of the present invention are included in the following detailed description.

Advantageous Effects

The anode active material for a lithium secondary battery according to an embodiment may provide a lithium secondary battery having excellent cycle-life characteristics.

MODE FOR INVENTION

Figure 1:
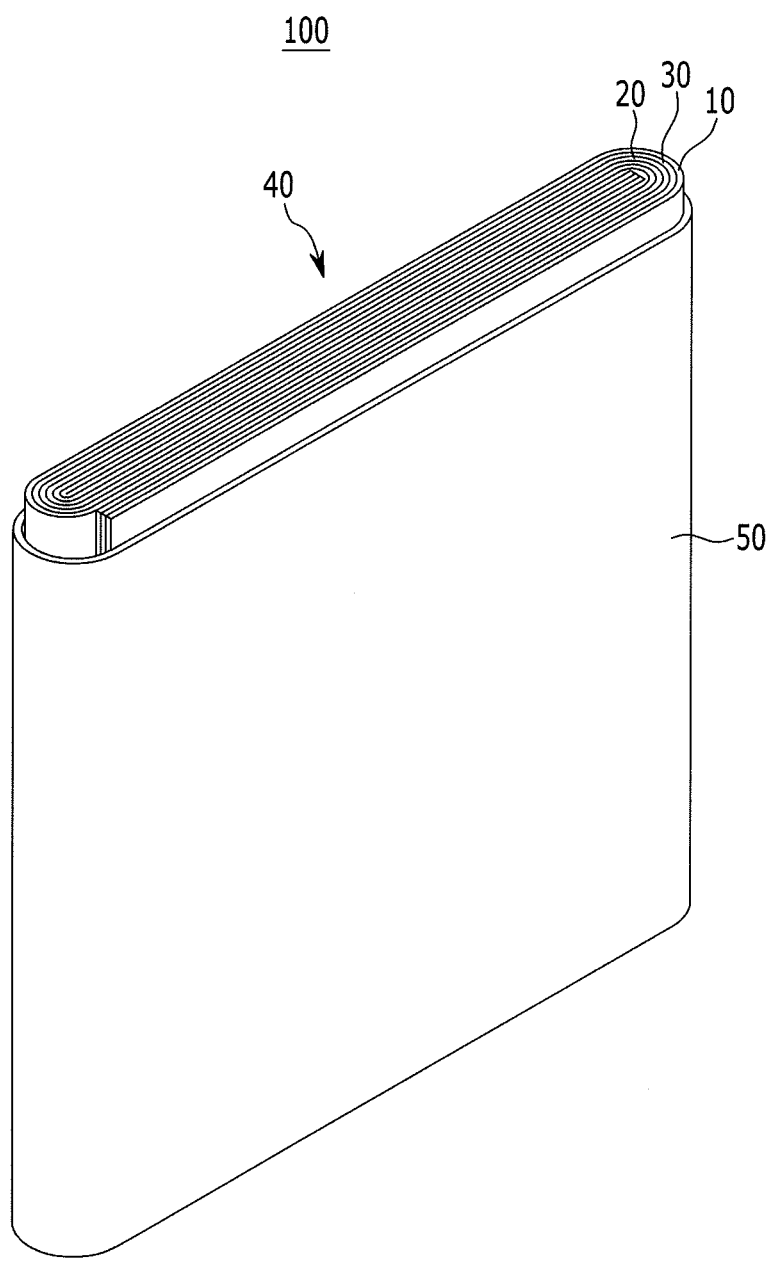
FIG. 1 is a schematic view of a structure of a lithium secondary battery according to an embodiment of the present invention.

Hereinafter, embodiments of the present invention will be described in detail. However, the present invention is not limited thereto, and the present invention is only defined by the scope of the following claims.

An anode active material for a lithium secondary battery according to an embodiment of the present invention includes a composite of a Si-based or Sn-based material and a carbon-based material.

The carbon-based material may have a vacancy defect and a Sp3 type defect on its surface. The presence of vacancy defects and Sp3 type defects may be measured from Raman spectral peak intensities. Particularly, the presence may be known from a Raman spectrum peak intensity ratio ($I_D/I_{D'}$) of a peak intensity ($I_D$) of a D peak (1360 cm$^{-1}$ to 1370 cm$^{-1}$) relative to a peak intensity ($I_{D'}$) of a D' peak (1620 cm$^{-1}$ to 1625 cm$^{-1}$) of the carbon-based material, and a suitable presence of such defects is known from a Raman spectrum peak intensity ratio ($I_G/I_D$) of a peak intensity ($I_G$) of a G peak (1580 cm$^{-1}$ to 1590 cm$^{-1}$) relative to a peak intensity ($I_D$) of a D peak (1360 cm$^{-1}$ to 1370 cm$^{-1}$).

According to an embodiment of the present invention, the Raman spectrum peak intensity ratio ($I_D/I_{D'}$) of the peak intensity ($I_D$) of the D peak (1360 cm$^{-1}$ to 1370 cm$^{-1}$) relative to the peak intensity ($I_{D'}$) of the D' peak (1620 cm$^{-1}$ to 1625 cm$^{-1}$) of the carbon-based material may be 4 to 10, and according to another embodiment, 4.5 to 9.0. When the Raman spectrum peak intensity ratio ($I_D/I_{D'}$) is within the ranges, electron density of the carbon-based material may be relaxed, and the dispersibility on the surface may be improved. Also, when the Raman spectrum peak intensity ratio ($I_D/I_{D'}$) is lower than 4.5, the defects may be excessively formed and consequently the Raman spectral peak intensity ratio ($I_G/I_D$) may be lowered, which is not desirable.

The Raman spectrum peak intensity ratio ($I_G/I_D$) of the peak intensity ($I_G$) of the G peak (1580 cm$^{-1}$ to 1590 cm$^{-1}$) relative to the peak intensity ($I_D$) of the D peak (1360 cm$^{-1}$ to 1370 cm$^{-1}$) of the carbon-based material may be 0.6 to 1.5, and according to another embodiment 0.65 to 1.2. When the Raman spectrum peak intensity ratio ($I_G/I_D$) is within the ranges, vacancy defects and Sp3 type defects existing on the surface of the carbon-based material may be properly present. When the Raman spectrum peak intensity ratio ($I_G/I_D$) exceeds 1.5, vacancy defects and Sp3 type defects are significantly deteriorated, Sp3 defects are more likely to be generated than vacancy defects, and the Raman spectral peak intensity ratio ($I_D/I_{D'}$) may be also increased, which is not desirable.

In addition, when the Raman spectrum peak intensity ratio of the carbon-based material is within the ranges, cycle-life characteristics may be improved and when one of the Raman spectrum peak intensity ratio ($I_D/I_{D'}$) or the peak intensity ratio ($I_G/I_D$) is out of the ranges, cycle-life characteristics may be deteriorated, which is not desirable.

In the present specification, the Raman spectrum peak intensity may be measured using a laser of about 514 nm wavelength or a laser of about 633 nm wavelength, unless it is specifically limited, and according to an embodiment, it may be measured using a laser of about 514 nm wavelength. An interpretation regarding such a Raman spectrum may be generally classified into a height ratio (intensity ratio) or an integral area ratio of peaks obtained from the Raman spectrum, and in an embodiment of the present invention, a height ratio may be referred. That is, it may refer to a peak intensity ratio ($I_D/I_{D'}$) of a height of the peak appearing in D (1360 cm$^{-1}$ to 1370 cm$^{-1}$), a peak intensity ($I_D$) relative to the height of the peak appearing in D' (1620 cm$^{-1}$ to 1625 cm$^{-1}$), a peak intensity ($I_{D'}$) and a peak intensity ratio ($I_G/I_D$) of a height of the peak appearing in G (1580 cm$^{-1}$ to 1590 cm$^{-1}$), a peak intensity ($I_G$) relative to a height of the peak appearing in D (1360 cm$^{-1}$ to 1370 cm$^{-1}$), a peak intensity ($I_D$) obtained in the Raman spectrum.

An average particle diameter (D50) of the Si-based or Sn-based material may be 30 nm to 80 nm, or 40 nm to 60 nm. When the average particle diameter (D50) of the Si-based or Sn-based material is within the ranges, expansion or contraction of the Si-based or Sn-based material may be suppressed during charging and discharging of the battery using the same, and thus, particle deformation may be suppressed and excellent cycle-life characteristics may be obtained. The average particle diameter (D50) generally refers to a diameter of a particle having a cumulative volume of 50 vol % in a particle size distribution, but unless defined otherwise in this specification, it may refer to an average of the diameters of 150 Si particles in a SEM photograph.

Thus, in an anode active material according to an embodiment of the present invention, when the Raman spectrum peak intensity ratio of the carbon-based material and the average particle diameter (D50) of the Si-based or Sn-based material are included within the ranges, cycle-life characteristics may be improved and if one of these conditions is not satisfied, cycle-life characteristics may be deteriorated, which are not desirable.

The Si-based or Sn-based material may be an alloy further including Fe, Ni, Mg, Na, or a combination thereof.

The carbon-based material may be crystalline carbon. The crystalline carbon may be unspecified shape, sheet-shaped, flake-shaped, sphere-shaped, or fiber-shaped natural graphite or artificial graphite, or a combination thereof. When the carbon-based material is amorphous carbon, the Raman spectrum peak intensity ratio according to an embodiment may not be obtained, so that the effect may not be obtained.

A mixing ratio of the Si-based or Sn-based material and the carbon-based material may be a weight ratio of 50:50 to 99:1, and preferably a weight ratio of 70:30 to 90:10. According to another embodiment, when the mixing ratio of the Si-based or Sn-based material and the carbon-based material is within the ranges, sufficient capacity may be increased due to the Si-based or Sn-based material and long cycle-life characteristics may be ensured due to low agglomeration of particles. The Si-based or Sn-based material may sufficiently increase capacity and secure a long cycle-life characteristics, since the particle accumulation is small.

The anode active material may be manufactured by the following process.

A process of surface-treating of the carbon-based material is performed. The surface-treating process is explained in detail. First, the carbon-based material, $K_2S_2O_8$, and $P_2O_5$ are mixed in acid.

The carbon-based material may be crystalline carbon. The acid may be $H_2SO_4$.

A mixing ratio of the carbon-based material and $K_2S_2O_8$ may be a weight ratio of 1:1 to 3:1 and a mixing ratio of the $K_2S_2O_8$ and $P_2O_5$ may be a weight ratio of about 1:1. When an amount of the carbon-based material is out of the range with respect to an amount of $K_2S_2O_8$, the surface oxidation of the carbon-based material may not sufficiently occur, which is not desirable.

The mixing process may be performed at 40° C. to 90° C. for 2 to 12 hours. When the mixing process is performed in the temperature range, an oxidation reaction may be sufficiently performed without a risk of explosion due to vapor generation. When the mixing process is performed at a temperature lower than the temperature range, the oxidation reaction does not occur well and it is difficult to form a vacancy defect on the surface and when the process is performed at a temperature higher than the temperature range, it is not appropriate because it can be exploded due to vapor generation.

After the mixing process is completed, it is cooled to produce a primary product.

The primary product is dipped in the acid. In this process, the carbon-based material is oxidized, and the oxide of the carbon-based material is formed.

The acid may be $HNO_3$, $H_2SO_4$, or a combination thereof. These acids are more easily penetrated into the carbon-based material and especially crystalline carbon, and thus may easily cause oxidization in a basal plane of the carbon-based material, particularly the crystalline carbon than other acids and may easily form vacancy defect. When it is not easy to be penetrated into the crystalline carbon, oxidation occurs mainly at edges of the crystalline carbon to causes only Sp3 defects, which is not desirable.

The acid dipping process may be performed at 40° C. to 90° C. for 2 hours to 12 hours.

When the reaction is performed at the above-mentioned temperature for the above-mentioned time, the oxidation reaction may be sufficiently generated without a risk of explosion due to vapor generation. When the acid dipping process is performed out of the temperature range, the oxidation reaction may not occur well, or an explosion may occur due to the vapor generation, and when the acid dipping process is performed out of the time range, it may hardly be reduced in the following process. In addition, when the acid dipping process is performed out of the above-mentioned temperature range or out of the above-mentioned time range, vacancy defects may not be well formed on the surface of the carbon-based material, strains may not be effectively reduced, and then agglomeration of particles is much generated in a spray-drying process and thus inappropriately increases particle sizes.

According to the surface treatment process, the vacancy defect and the Sp3 defect are formed on the surface of the carbon-based material, and accordingly, an oxide of the carbon-based material is formed and thus may relieve electron density and in addition, reduce the charge relieving and the strain. Accordingly, when the oxide of the carbon-based material formed through the surface treatment process is mixed with the Si-based or Sn-based material, agglomeration of the Sn-based or Sn-based material may be suppressed.

In general, a carbon-based materials, specifically, crystalline carbon, and particularly, a graphene layer has high electron density on the surface due to a conjugation bond, and in addition, when mixed with a Si-based or Sn-based material, clustering between surface particles thereof are formed due to a charge strain of a hexagonal plane and thus bring about a non-uniform particle size and reduce dispersibility and accordingly, increase agglomeration of the Si-based or Sn-based material. Resultantly, the Si-based or Sn-based material in the anode active material may inappropriately have an excessively increased size.

Accordingly, in the present invention, the prepared oxide of the carbon-based material is mixed with the Si-based or Sn-based material in a solvent. Herein, the oxide of the carbon-based material is mixed with the Si-based or Sn-based material in a weight ratio of 50:50 to 99:1 and specifically, 70:30 to 90:10. When the mixing ratio of the oxide of the carbon-based material with the Si-based or Sn-based material are out of the range, for example, a Si amount is too low, desired high capacity may not be accomplished, while when the Si amount is too high, the agglomeration of particles may be more firmly generated.

The solvent may be water, ethanol, or a combination thereof.

The obtained mixture is spray-dried. This spray-drying process may be performed at 25° C. to 200° C. For example, the spray-drying process may be performed by using a spray-drier set at an inlet temperature of 45° C. to 200° C. and an outlet temperature of 80° C. to 120° C.

The spray-dried product is heat-treated at 600° C. to 900° C. under a mixed atmosphere of $H_2$ and Ar to prepare an anode active material. The heat treatment process may be performed for 2 hours to 12 hours. When the heat treatment is performed within the temperature range, a reduction reaction may be sufficiently generated, and surface impurities may be effectively removed.

According to this heat treatment process, the oxide of the carbon-based material is reduced and formed back into the carbon-based material, and herein, a composite of this carbon-based material with the Si-based or Sn-based material is prepared as an anode active material.

In the mixed atmosphere of $H_2$ and Ar, $H_2$ and Ar may be mixed in a volume ratio of 1:99 to 10:90.

When the heat treatment process is performed under the mixed atmosphere of $H_2$ and Ar, the carbon-based material may have the desired Raman spectrum peak intensity ratio, that is, a Raman spectrum peak intensity ratio ($I_D/I_{D'}$) of the peak intensity ($I_D$) of the D peak (1360 $cm^{-1}$ to 1370 $cm^{-1}$) relative to the peak intensity of the D' peak (1620 $cm^{-1}$ to 1625 $cm^{-1}$) in a range of 4.5 to 10, and the peak intensity ratio ($I_G/I_D$) of the peak intensity ($I_G$) of the G peak (1580 $cm^{-1}$ to 1590 $cm^{-1}$) relative to the peak intensity ($I_D$) of the D peak (1360 $cm^{-1}$ to 1370 $cm^{-1}$) in a range of 0.6 to 1.5.

When the heat treatment process is performed under a $H_2$ or Ar atmosphere alone, a carbon-based material having the desired Raman spectrum peak intensity ratio may not be obtained, and in addition, a Sp3 defect in which a surface charge strain decrease of the carbon-based material is small, is mainly formed on the edge of the carbon-based material, and accordingly agglomeration of the Si-based or Sn-based material is inappropriately generated. Or even when the heat treatment process is performed under the mixed atmosphere of $H_2$ and Ar, but when $H_2$ and Ar are used out of the mixing ratio, for example, when $H_2$ is used in a higher amount, there may be a risk of explosion, while when $H_2$ is used in a lower ratio, the vacancy defect may be difficult to obtain.

In the prepared anode active material, the carbon-based material may have the vacancy defect and the Sp3 defect formed on the surface, which may be confirmed from the Raman spectrum peak intensity ratio ($I_D/I_{D'}$) and the Raman spectrum peak intensity ratio ($I_G/I_D$).

Another embodiment of the present invention provides a lithium secondary battery including an anode including the anode active material, a cathode comprising a cathode active material, and an electrolyte.

The anode includes an anode active material layer and a current collector supporting the anode active material layer.

In the anode active material layer, an amount of the anode active material may be 95 wt % to 99 wt % based on a total amount of the anode active material layer.

In an embodiment of the present invention, the anode active material layer may include a binder, and optionally a conductive material. In the anode active material layer, an amount of the binder may be 1 wt % to 5 wt % based on a total amount of the anode active material layer. When the conductive material is further included, 90 wt % to 98 wt % of the anode active material, 1 wt % to 5 wt % of the binder, and 1 wt % to 5 wt % of the conductive material may be used.

The binder serves to adhere the anode active material particles to each other and to adhere the anode active material to a current collector. The binder includes a non-aqueous binder, an aqueous binder, or a combination thereof.

The non-aqueous binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may be selected from a styrene-butadiene rubber, an acrylated styrene-butadiene rubber (SBR), an acrylonitrile-butadiene rubber, an acrylic rubber, a butyl rubber, polypropylene, an ethylene propylene copolymer, polyepichlorohydrine, polyphosphazene, polyacrylonitrile, polystyrene, ethylenepropylenedienecopolymer, polyvinylpyridine, chlorosulfonated polyethylene, latex, a polyester resin, an acrylic resin, a phenolic resin, an epoxy resin, polyvinyl alcohol, or a combination thereof.

When the aqueous binder is used as the anode binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of 0.1 parts by weight to 3 parts by weight based on 100 parts by weight of the anode active material.

The conductive material is included to provide electrode conductivity and any electrically conductive material may be used as a conductive material unless it causes a chemical change in a battery. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The cathode may include a positive current collector and a cathode active material layer formed on the positive current collector. The cathode active material may include lithiated intercalation compounds that reversibly intercalate and deintercalate lithium ions. Specifically, one or more composite oxides of a metal selected from cobalt, manganese, nickel, and a combination thereof, and lithium may be used. More specific examples may be compounds represented by one of the following chemical formulae. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $Li_aFePO_4$ ($0.90 \leq a \leq 1.8$)

In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a cathode active material by using these elements in the compound. For example, the method may include any coating method such as spray coating, dipping, and the like, but is not illustrated in more detail since it is well-known in the related field.

In the cathode, an amount of the cathode active material may be 90 wt % to 98 wt % based on a total weight of the cathode active material layer.

In an embodiment of the present disclosure, the cathode active material layer may further include a binder and a conductive material. Herein, each amount of the binder and the conductive material may be 1 wt % to 5 wt % based on a total weight of the cathode active material layer.

The binder improves binding properties of cathode active material particles with one another and with a current collector. Examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene butadiene rubber, an acrylated styrene butadiene rubber, an epoxy resin, nylon, and the like, but are not limited thereto.

The conductive material is included to provide electrode conductivity and any electrically conductive material may be used as a conductive material unless it causes a chemical change in a battery. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethyl acetate, methyl propionate, ethyl propionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. In addition, the ketone-based solvent may be cyclohexanone, and the like. The alcohol based solvent may include ethanol, isopropyl alcohol, and the like, and the aprotic solvent may include nitriles such as R—CN (wherein R is a C2 to C20 linear, branched, or cyclic hydrocarbon group, a double bond, an aromatic ring, or an ether bond), and the like, amides such as dimethyl formamide, and the like, dioxolanes such as 1,3-dioxolane, and the like, sulfolanes, and the like.

The organic solvent may be used alone or in a mixture and when the organic solvent is used in a mixture, a mixture ratio may be controlled in accordance with a desirable battery performance, which may be understood by a person having an ordinary skill in this art.

In addition, the carbonate-based solvent may include a mixture of a cyclic carbonate and a chain-type carbonate. In this case, when the cyclic carbonate and the chain-type carbonate may be mixed together in a volume ratio of 1:1 to 1:9, performance of an electrolyte solution may be enhanced.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1.

[Chemical Formula 1]

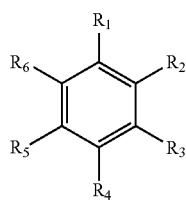

In Chemical Formula 1, $R_1$ to $R_6$ are the same or different, and are selected from the group consisting of hydrogen, a halogen, a C1 to C10 alkyl group, a haloalkyl group, and a combination thereof.

Specific examples of the aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate or an ethylene carbonate-based compound of Chemical Formula 2 as an additive for improving the cycle-life characteristics.

[Chemical Formula 2]

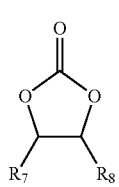

In Chemical Formula 2, $R_7$ and $R_8$ are the same or different and selected from the group consisting of hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.

Examples of the ethylene-based carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life characteristics may be used within an appropriate range.

The lithium salt dissolved in an organic solvent supplies a battery with lithium ions, basically operates the lithium secondary battery, and improves transportation of the lithium ions between a cathode and an anode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example an integer ranging from 1 to 20), LiCl, LiI, and $LiB(C_2O_4)_2$ (lithium bis (oxalato) borate: LiBOB). A concentration of the lithium salt may range from 0.1 M to 2.0 M. When the lithium salt is included at the above concentration range, an electrolyte may have excellent performance and lithium ion mobility due to optimal electrolyte conductivity and viscosity.

The lithium secondary battery may further include a separator between the anode and the cathode, depending on a type of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

FIG. 1 is an exploded perspective view of a lithium secondary battery according to one embodiment. The lithium secondary battery according to an embodiment is illustrated as a prismatic battery but is not limited thereto and may include variously-shaped batteries such as a cylindrical battery, a pouch battery, and the like.

Referring to FIG. 1, a lithium secondary battery 100 according to an embodiment may include an electrode assembly 40 manufactured by winding a separator 30 disposed between a cathode 10 and an anode 20 and a case 50 housing the electrode assembly 40. An electrolyte (not shown) may be impregnated in the cathode 10, the anode 20, and the separator 30.

Hereinafter, examples of the present invention and comparative examples are described. These examples, however, are not in any sense to be interpreted as limiting the scope of the invention.

Example 1

5.0 g of spherical-shaped natural graphite, 2.0 g of $K_2S_2O_8$, and 2.0 g of $P_2O_5$ were dissolved in 25 ml of $H_2SO_4$ at 80° C. and reacted for 4.5 hours. Then, a reaction product obtained therefrom was cooled down and filtered, and the filtered slurry was sufficiently washed with distilled water and then, dried.

The dried product was dipped in 20 ml of $HNO_3$ and reacted at 80° C. for 4 hours and then, cooled down and filtered, and then, the filtered product was sufficiently washed with distilled water and dried to prepare graphite oxide.

The prepared graphite oxide was mixed with nano-silicon having an average particle diameter (D50) of 30 nm in a weight ratio of 4:1 in a water solvent to prepare dispersion. The dispersion was spray-dried by using a spray drier set at an inlet temperature of 150° C. and at an outlet temperature of 100° C.

Subsequently, a spray-dried precursor obtained through the spray drying process was fired at 700° C. for 2 hours under a mixed atmosphere of $H_2$ and Ar (a volume ratio of 10:90), and the fired product was slowly cooled down to prepare a composite anode active material of graphite and Si. In the prepared composite anode active material, graphite and Si were mixed in a weight ratio of 4:0.6.

Comparative Example 1

A composite anode active material of graphite and Si was prepared according to the same method as Example 1 except that the spray-dried precursor obtained through the spray drying process was fired at 700° C. for 2 hours under an Ar atmosphere alone.

In the prepared composite anode active material, graphite and Si were mixed in a weight ratio of 4:0.6.

Comparative Example 2

5.0 g of spherical-shaped natural graphite, 2.0 g of $K_2S_2O_8$, and 2.0 g of $P_2O_5$ were dissolved in 25 ml of $H_2SO_4$ at 80° C. and then, reacted for 4.5 hours. The obtained reaction product was cooled down and filtered, and then, the filtered slurry was sufficiently washed with distilled water and dried.

The dried product was dipped in 20 ml of $HNO_3$ and reacted at 80° C. for 4 hours and the obtained product was fired under a different condition from that of Example 1. Specifically, the reaction product was fired at 700° C. for 2 hours under an Ar atmosphere. Subsequently, the fired product was cooled down and filtered, and the filtered product was sufficiently washed with distilled water and dried to prepare graphite oxide.

The graphite oxide was mixed with nano-silicon having an average particle diameter (D50) of 30 nm in a weight ratio of 4:1 in a water solvent to prepare dispersion. The dispersion was spray-dried by using a spray drier having set at an inlet temperature of 150° C. and at an outlet temperature of 100° C.

Subsequently, a spray-dried precursor obtained through the spray drying process was fired at 700° C. for 2 hours under a mixed atmosphere of $H_2$ and Ar (a volume ratio of 10:90), and the fired product was slowly cooled down to prepare a composite anode active material of graphite and Si. In the composite anode active material, graphite and Si were mixed in a weight ratio of 4:0.6.

Comparative Example 3

5.0 g of spherical-shaped natural graphite, 2.0 g of $K_2S_2O_8$, and 2.0 g of $P_2O_5$ were dissolved in 25 ml of $H_2SO_4$ and reacted at a different temperature for a different time from those of Example 1. Specifically, 5.0 g of spherical-shaped natural graphite, 2.0 g of $K_2S_2O_8$, and 2.0 g of $P_2O_5$ were dissolved in 25 ml of $H_2SO_4$ at 50 C and reacted for 1 hour. The obtained reaction product was cooled down and filtered, and the filtered slurry was sufficiently washed with distilled water and dried.

The dried product was dipped in 20 ml of $HNO_3$ and reacted at a different temperature for a different time from those of Example 1. Specifically, the product was reacted at 45° C. for 1 hour after the dipping and then, cooled down and filtered, and the filtered product was sufficiently washed with distilled water and dried to prepare graphite oxide.

The prepared graphite oxide was mixed with nano-silicon having an average particle diameter (D50) of 30 nm in a weight ratio of 4:1 in a water solvent to prepare dispersion. The prepared dispersion was spray-dried by using a spray-drier set at an inlet temperature of 150° C. and an outlet temperature of 100° C.

Subsequently, a spray-dried precursor obtained through the spray drying process was fired at 700° C. for 2 hours under a mixed atmosphere of $H_2$ and Ar (a volume ratio of 10:90), and the fired product was slowly cooled down to prepare a composite anode active material of graphite and Si. In the prepared composite anode active material, graphite and Si were mixed in a weight ratio of 4:0.6.

Comparative Example 4

5.0 g of spherical-shaped natural graphite, 2.0 g of $K_2S_2O_8$, and 2.0 g of $P_2O_5$ were dissolved in 25 ml of $H_2SO_4$ and reacted at 80° C. for 4.5 hours. The obtained reaction product was cooled down and filtered, and the filtered slurry was sufficiently washed with distilled water and dried.

The dried product was dipped in 20 ml of $HNO_3$ and reacted at 80° C. for a different time from that of Example 1 and then, fired. Specifically, the product was reacted for 8 hours and then, fired at 700° C. for 2 hours under an Ar atmosphere, cooled down, and filtered, and the filtered product was sufficiently washed with distilled water and dried to prepare graphite oxide.

The prepared graphite oxide was mixed with nano silicon having an average particle diameter (D50) of 30 nm in a weight ratio of 4:1 in a water solvent to prepare dispersion. The prepared dispersion was spray-dried by using a spray-drier set at an inlet temperature of 150° C. and an outlet temperature of 100° C.

Subsequently, a spray-dried precursor obtained through the spray drying process was fired at 700° C. for a different time from that of Example 1 and then, treated through an additional firing process. Specifically, the spray-dried precursor was fired for 3 hours under a mixed atmosphere of $H_2$ and Ar (a volume ratio of 10:90) and then, additionally fired at 850° C. for 2 hours by increasing a temperature at 5° C./min The fired product was slowly cooled down to prepare a composite anode active material of graphite and Si. In the prepared composite anode active material, graphite and Si were mixed in a weight ratio of 4:0.6.

SEM Measurement and EDS (Energy Dispersive X-Ray Spectrometer) Mapping Image

Figure 2:
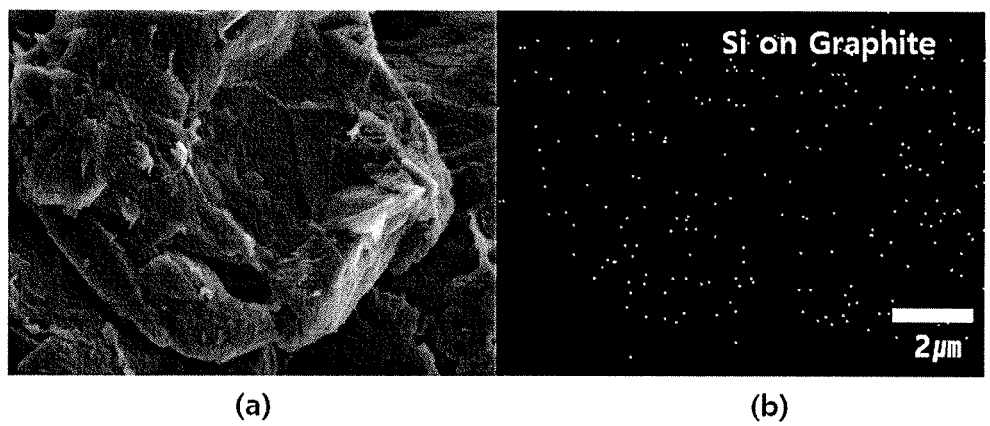
FIG. 2 is a SEM photograph of the anode active material prepared according to Example 1.

A SEM image of the anode active material according to Example 1 (5000 times magnified) was measured, and the result was shown in (a) of FIG. 2. In addition, EDS of the anode active material was measured, and the mapping result of Si was shown in (b) of FIG. 2.

Raman Intensity Ratio

Raman spectra of the anode active materials according to Example 1 and Comparative Examples 1 and 2 were measured at 514 nm. In the Raman spectrum result, the peak intensity ratios ($I_D/I_{D'}$) of the peak intensity (height) of the D peak (1360 cm$^{-1}$) relative to the peak intensity (height) of the D' peak (1620 cm$^{-1}$) and the peak intensity ratios ($I_G/I_D$) of the peak intensity (height) of the G peak (1580 cm$^{-1}$) relative to the peak intensity (height) of the D peak (1360 cm$^{-1}$) are shown in Table 1.

Measurement of Si Size

Average particle diameters of 150 Si particles in SEM images as average particle diameters of Si included in each anode active materials according to Example 1 and Comparative Examples 1 and 2 were calculated, and the results are shown in Table 1.

Evaluation of Cycle-Life Characteristics 96.5 wt % of each anode active material according to Example 1 and Comparative Examples 1 and 2, 2 wt % of a styrene-butadiene rubber binder, and 1.5 wt % of carboxylmethyl cellulose 1 were mixed in a water solvent to prepare anode active material slurry. Then, an anode was manufactured in a common process of coating the anode active material slurry on a Cu current collector and then, drying and compressing it.

The anode, a lithium metal counter electrode, and an electrolyte solution were used in a common method to manufacture a half-cell. The electrolyte solution was prepared by using a mixed solvent of carbonate, ethylmethyl carbonate, and dimethyl carbonate (a volume ratio of 2:1:7) in which 1 M LiPF$_6$ was dissolved and to which fluoroethylene carbonate was added. In the electrolyte solution, the fluoroethylene carbonate was used in an amount of 5 wt % based on 100 wt % of the mixed solvent.

The half-cell was 500 times charged at 0.5 C and discharged at 0.5 C and at 25° C. to measure discharge capacity. Discharge capacity ratios of the half-cells of discharge capacity at the 500$^{th}$ cycle relative to discharge capacity at the 1$^{st}$ cycle were calculated, and the results are shown in Table 1.

In addition, since the anode active material of Comparative Example 1 was prepared by performing a heat treatment under an Ar atmosphere in the preparation, a Sp3 defect was mainly formed, and accordingly, Si's were agglomerated and showed an increased average particle diameter (D50) of 85 nm in the prepared anode active material. Particularly, since the anode active materials of Comparative Examples 2 and 4 were additionally dipped in HNO$_3$ and fired at 700° C. for 2 hours, vacancy defects were not well formed, and the Sp3 defects were mainly formed, and accordingly, Si agglomeration was generated and Si average particle diameters (D50) were greatly increased up to 180 nm to 310 nm.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

The invention claimed is:

1. An anode active material for a lithium secondary battery, the anode active material comprising:
   a composite of a Si-based material or Sn-based material and a carbon-based material,
   wherein:
   the carbon-based material is graphite,
   a Raman spectrum peak intensity ratio ($I_D/I_{D'}$) of a peak intensity ($I_D$) of a D peak (1360 cm$^{-1}$ to 1370 cm$^{-1}$) relative to a peak intensity ($I_{D'}$) of a D' peak (1620 cm$^{-1}$ to 1625 cm$^{-1}$) of the carbon-based material is 4.5 to 10,
   a peak intensity ratio ($I_G/I_D$) of a peak intensity ($I_G$) of a G peak (1580 cm$^{-1}$ to 1590 cm$^{-1}$) relative to a peak intensity ($I_D$) of a D peak (1360 cm$^{-1}$ to 1370 cm$^{-1}$) of the carbon-based material is 0.6 to less than 1.0, and

TABLE 1

|  | Example 1 | Comparative Example 1 | Comparative Example 2 | Comparative Example 3 | Comparative Example 4 |
|---|---|---|---|---|---|
| $I_D/I_{D'}$ | 5.2 | 8.4 | 12 | 18 | 4.3 |
| $I_G/I_D$ | 0.7 | 0.58 | 0.34 | 3.2 | 0.56 |
| Si average particle diameter (D50, nm) | 52 | 85 | 300 | 312 | 180 |
| Cycle-life characteristics (%) | 80 | 69 | less than 50 (sharply decreased) | less than 50 (sharply decreased) | 57% |

As shown in Table 1, the half-cell using the anode active material of Example 1 showed excellent cycle-life characteristics compared with half-cells respectively using those of Comparative Examples 1 to 4. The reason is that the anode active material according to Example 1 showed peak intensity ratios ($I_D/I_{D'}$) and ($I_G/I_D$) in each range of 4.5 to 10 and 0.6 to 1.5 and an average particle diameter (D50) of Si included in the anode active material in a range of 40 nm to 65 nm, while the anode active materials according to Comparative Examples 1 to 4 showed peak intensity ratios ($I_G/I_D$) out of the range of 0.6 to 1.5, and the anode active materials according to Comparative Examples 2 to 4 showed peak intensity ratios ($I_D/I_{D'}$) out of the range of 4.5 to. 10.

In particular, the anode active materials of Comparative Examples 2 and 3 having peak intensity ratios ($I_D/I_{D'}$) of greater than 10 were drastically reduced in cycle-life characteristics and greatly decreased to less than 50%.

particles of the Si-based material or Sn-based material on the graphite in the composite have an average diameter (D50) of 30 to 80 nm.

2. The anode active material for a lithium secondary battery of claim 1, wherein the Raman spectrum peak intensity ratio ($I_D/I_{D'}$) of the peak intensity ($I_D$) of the D peak (1360 cm$^{-1}$ to 1370 cm$^{-1}$) relative to the peak intensity ($I_{D'}$) of the D' peak (1620 cm$^{-1}$ to 1625 cm$^{-1}$) of the carbon-based material is 4.5 to 9.0.

3. The anode active material for a lithium secondary battery of claim 1, wherein the particles of the Si-based material or Sn-based material in the composite have an average particle diameter (D50) of 40 nm to 60 nm.

4. The anode active material for a lithium secondary battery of claim 1, wherein the Si-based material or Sn-based material is an alloy further comprising Fe, Ni, Mg, Na, or a combination thereof.

5. The anode active material for a lithium secondary battery of claim 1, wherein a mixing ratio of the Si-based material or Sn-based material and the carbon-based material is a weight ratio of 50:50 to 99:1.

6. A lithium secondary battery, comprising
an anode comprising the anode active material of claim 1;
a cathode comprising a cathode active material; and
an electrolyte.

7. The anode active material for a lithium secondary battery of claim 1, wherein the composite of the Si-based material or Sn-based material and the carbon-based material is prepared by:
surface treating a preliminary carbon-based material to form an oxide of the preliminary carbon-based material by mixing the preliminary carbon-based material with $K_2S_2O_8$, $P_2O_5$, and a first acid at 40° C. to 90° C. for 2 to 12 hours and then dipping a resultant in a second acid at 40° C. to 90° C. for 2 hours to 12 hours,
mixing the oxide of the preliminary carbon-based material with the Si-based material or Sn-based material in a solvent;
spray drying the mixture of the oxide of the preliminary carbon-based material and the Si-based material or Sn-based material; and
heat treating the dried mixture of the oxide of the preliminary carbon-based material and the Si-based material or Sn-based material at 600° C. to 900° C. under a mixed atmosphere of $H_2$ and Ar for 2 hours to 12 hours.

8. The anode active material for a lithium secondary battery of claim 7, wherein the carbon-based material includes a vacancy defect and a $sp^3$ defect on a surface thereof.

* * * * *